March 28, 1944. W. F. SCHACHT 2,345,292
COMBINED CATTLE MARKER AND MUZZLE CHAIN
Filed April 12, 1943 2 Sheets-Sheet 1
Fig.1.
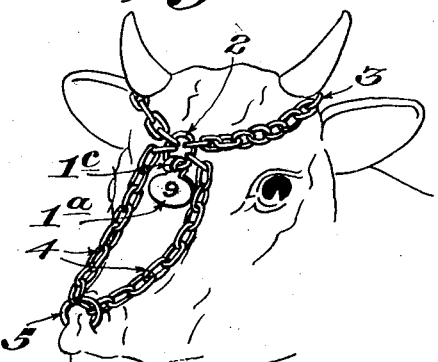
Fig.2.
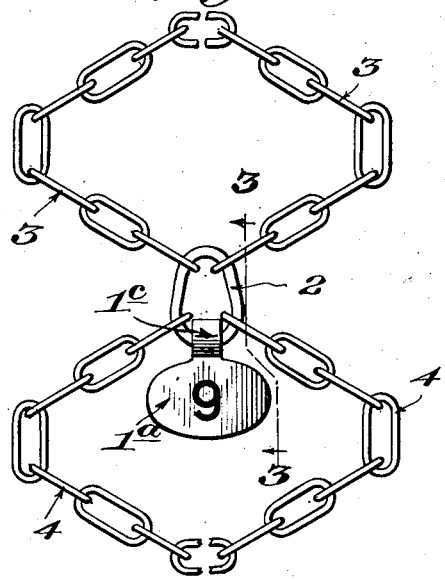
Fig.3. Fig.5.
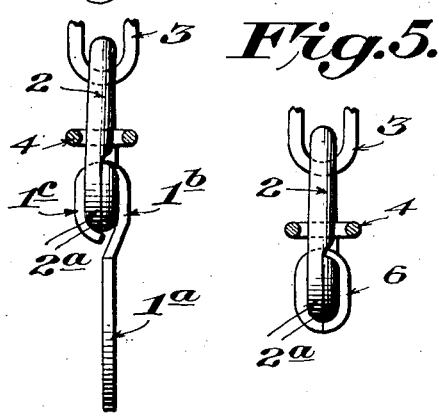
Fig.4.
Fig.6. Fig.7.
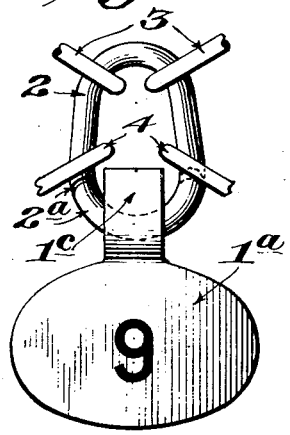
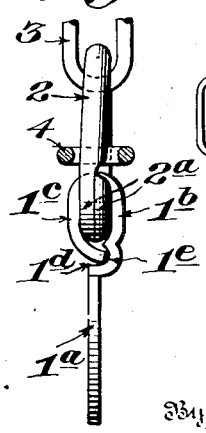
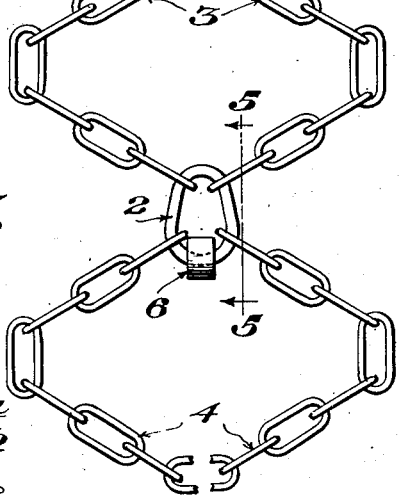
Inventor
William F. Schacht
Alexander Dowell
Attorneys

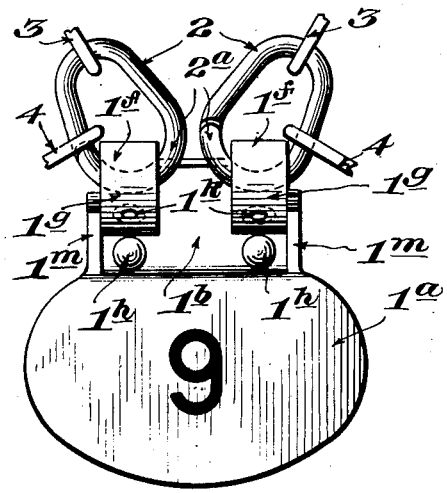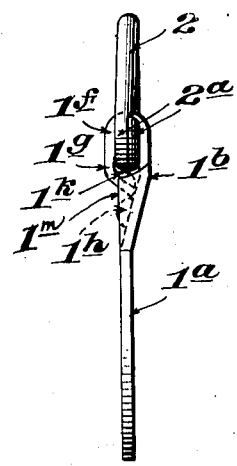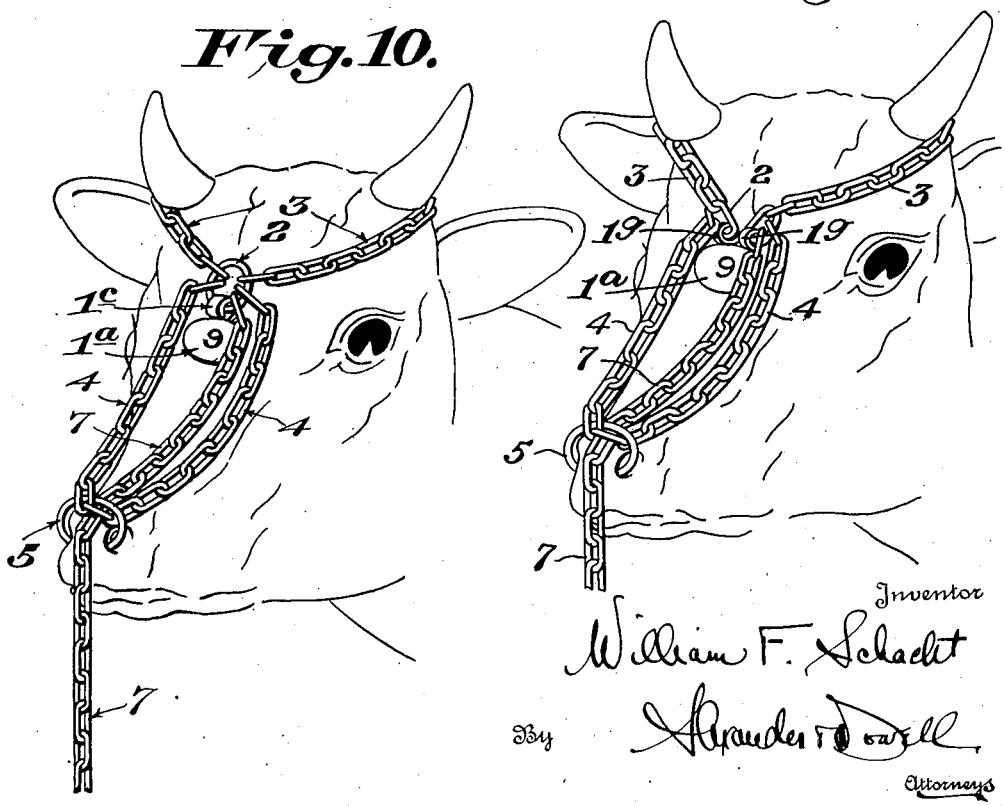

Patented Mar. 28, 1944

2,345,292

UNITED STATES PATENT OFFICE 2,345,292

COMBINED CATTLE MARKER AND MUZZLE CHAIN

William F. Schacht, Huntington, Ind.

Application April 12, 1943, Serial No. 482,749

12 Claims. (Cl. 119—96)

This invention is a novel combined cattle marker and muzzle chain adapted to be applied as a horn chain marker to cattle and other animals, particularly dangerous bulls, so that farmers, herdsmen or breeders can readily identify same, and whereby same may be handled, controlled, or restrained, or tied in stalls or other places; the present invention being an improvement upon the marker shown in my copending application Serial No. 480,529, filed March 25, 1943.

In said copending application, several types of markers are disclosed, one of which comprises a chain adapted to encircle the spaced horns or neck of the animal, the ends of the chain being engaged in a special split link having flattened overlapping ends which are forcibly pressed together to lock the ends of the chain therein, and the overlapping ends of the link then held clamped together by means of an indicia plate of suitable material, such as brass or steel, said plate bearing appropriate identification indicia and having a shank at its upper edge which is rolled to form an eye which latter is clamped firmly around the overlapping ends of the link to serve as a lock preventing the link from opening under normal strains on the chain.

Another type of marker disclosed in my said copending application comprises a modification in which the shank of the marker plate is provided with spaced tongues which are rolled or bent back upon themselves to form a pair of spaced integral eyes, and in which each end of the chain is provided with a split link as above described, the overlapping ends of the split link at one end of the chain being locked or clamped by one of said eyes while the other eye is left partly open, so that in applying the marker to the animal it is only necessary to pass the chain around the neck or spaced horns thereof, and then engage the split link adjacent the free end of the chain in said open eye, thereafter applying sufficient pressure to close the open eye into clamping or locking position around the overlapping ends of the related split link, the marker plate thus itself locking the ends of the chain together around the neck or spaced horns of the live-stock.

Such animals, particularly dangerous or unruly bulls, are usually equipped with large nose rings for the purpose of facilitating handling, and for the purpose of receiving halter straps for tying same in stalls or other desired places; but as bulls are ordinarily dangerous animals it is generally unsafe to attempt to handle bulls by the above mentioned relatively small nose rings alone, it being difficult to catch the bull thereby, and many farmers and herdsmen have been gored or otherwise injured in such attempts.

According to my present invention, one object thereof is to utilize horn chain markers of the general types disclosed in my aforesaid copending application, and in addition to the cattle marker features thereof, to apply or pass a looped muzzle chain through the nose ring of the animal, and secure both upper ends thereof to the single split link where the cattle marker is provided with a single eye and link, or secure the upper ends of the looped chain to the two split links respectively when the marker is provided with two spaced eyes and links; the chain being thus disposed centrally of the muzzle of the animal in a position or location in which it is easy for the farmer or herdsmen to grab and hold the chain, the lower end of the looped muzzle chain being anchored in the nose ring, and the upper ends secured to the horn marker link, or links, lying upon the center of the forehead of the animal. As the nose ring is anchored in the relatively tough but sensitive flesh of the animal's nose, the animal can be readily handled and controlled by the muzzle chain without danger of the split link or links opening to permit the marker chain and muzzle chain to drop off of the animal's head, and without imposing any strain or stress whatsoever on the marker plate itself.

In addition to the muzzle chain above mentioned, another object of my invention is to provide a third chain having its upper end secured to the split link of the marker plate, said third chain passing downwardly along the muzzle of the animal and through the nose ring and hanging or dangling downwardly terminating somewhat above the ground level, so that the farmer or herdsman may readily grab the dangling chain and control or handle the animal as said third chain also passes through the nose ring.

A still further object of the invention is to provide a combined cattle marker and muzzle chain of the above type wherein the muzzle chain, per se, may be initially omitted when the marker plate is applied to very young cattle, but after the animal grows in size the nose ring can thereafter be applied thereto and the muzzle chain added to the assembly in the manner above described.

A still further object is the provision of an assembly in which the marker plate, per se, may be omitted when identification is not desired, and a strap similar in all respects to the rolled eye-forming shank of the marker plate used, the strap being rolled or bent around the overlapping ends of the split link in the same manner as the eye of the marker plate, above described.

Other minor objects of the invention will be hereinafter set forth.

I will explain the invention with reference to the accompanying drawings which illustrate various practical embodiments thereof, to enable others to adopt and use the same; and will summarize in the claims, the novel features of construction, and novel combinations of parts, for which protection is desired.

In said drawings:

Fig. 1 is a perspective view showing one form of my novel combined horn marker and muzzle chain applied to the head of a bull.

Fig. 2 is an enlarged plan view of the assembly shown in Fig. 1 showing both ends of the horn chain secured in a split link and showing both ends of the muzzle chain secured in the split link.

Fig. 3 is an enlarged section on the line 3—3, Fig. 2.

Fig. 4 is a plan view, similar to Fig. 2, of a modified assembly in which the marker plate, per se, is omitted, but showing a rolled strap performing the same function as the eye of the marker plate shown in Fig. 2.

Fig. 5 is an enlarged section on the line 5—5, Fig. 4.

Fig. 6 is a plan view showing another modified marker plate of the assembly.

Fig. 7 is a side elevation of the marker plate shown in Fig. 6.

Fig. 8 is a plan view, similar to Fig. 2, of a further modified marker plate having two integral eyes formed on the shank, each receiving split links at the ends of the horn chain, and showing the ends of the muzzle chain secured in the respective split links.

Fig. 9 is a side elevation of the marker plate shown in Fig. 8.

Fig. 10 is a perspective view of a further modified form in which the assembly shown in Fig. 1 is provided with a third chain passing downwardly through the nose ring of the animal.

Fig. 11 is a perspective view similar to Fig. 10 but including in the assembly the marker plate shown in Fig. 8.

As shown in Figs. 1 to 3, the combined marker plate and muzzle chain comprises a plate of sheet metal, such as brass or steel, having a body portion 1a provided with an integral shank 1b of substantial length extending from its upper edge, shank 1b being offset rearwardly of the plane of plate 1a, and being rolled forwardly to form an eye 1c, the outer tip of the eye substantially engaging the shank 1b adjacent its base, as shown in Fig. 3. Plate 1a carries suitable indicia such as "9" or may have engraved, stamped or otherwise formed thereon any other desired indicia to identify or classify the particular animal. Within the eye 1c of plate 1a is a relatively large split link 2, shown more particularly in Fig. 3, having flattened overlapping portions 2a at its lower end which are normally open to receive therein the ends of the horn chain 3 and muzzle chain 4 before closing.

The muzzle chain 4, as shown in Fig. 1, is passed through the nose ring 5 anchored in the flesh of the animal's nose in the usual manner, the ends of chain 4 passing upwardly along the muzzle of the animal and having both ends engaged in the split link 2, the chain 4 being drawn sufficiently taut to prevent the horn chain 3 from slipping over the horns of the live-stock. The use of the splint link 2 permits the chains 3 and 4 to be adjusted as to length by engaging any links thereof in the split link 2. The opened ends 2a of split link 2 are then forced together by means of pliers or the like, after which the overlapping portions 2a of link 2 are securely locked or clamped together by closing the eye 1c of marker plate 1a therearound as indicated in Fig. 3 to prevent opening of link 2 due to normal stresses on the chains 3 and 4 which opening would permit separation of the ends of the said chains. By this construction no stress whatsoever is placed upon the marker plate itself.

When thus applied to the animal the same serves not only as a horn marker therefor, but also serves as a muzzle chain permitting the farmer or herdsman to handle the animal with safety since he can readily grab either or both branches of the muzzle chain 4 which has its lower end anchored in the nose ring 5. Moreover the split link 2 when locked closed by eye 1c renders the chains 3 and 4 endless, and no normal stress or strain on either chain 3 or 4 will cause the link 4 to open. Muzzle chain 4 is obviously much easier to grab or grasp than the relatively small nose ring 5 itself when it is desired to control or restrain the animal.

Another advantage of my combination cattle marker and muzzle chain is that the same may be marketed as the unit shown in Fig. 2, or the muzzle chain 4 could be marketed separately from the rest of the assembly, so that the horn marker alone could initially be applied to very young livestock, and after the same had grown, the nose ring 5 could then be anchored in the animal's nose and the muzzle chain 4 incorporated in the assembly.

In Figs. 4 and 5 a modified assembly is shown in which similar parts bear the same numerals. In this modification, the marker plate, per se, is omitted, but the overlapping ends of the split link 2 are locked in closed position to secure the ends of chains 3 and 4 therein by means of a strap 6 which is rolled in the form of an eye around the overlapping ends 2 and serves the same purpose as the eye 1c of marker plate 1a in Figs. 1 to 3. This modification may be used in event identification of the animal is not desired, the assembly otherwise functioning in the same manner as above described in connection with Figs. 1–3 inclusive.

In Figs. 6 and 7 another modification is shown in which the plate 1a carries means thereon for preventing the eye 1c from opening due to abnormal stresses on chains 3 or 4, the shank 1b of the plate 1a having a shoulder 1d thereon upon which the outer tip of the rolled eye 1c seats, the shoulder in this case being formed by a transverse groove 1e pressed into the material of the shank 1b. Obviously the shoulder 1d could be formed by knobs on the shank as shown in Figs. 8 and 9, or by raised ribs, or other offset means. The chains 3 and 4 would function in the same manner previously described.

In Figs. 8 and 9 a modified assembly is shown, in which marker plate 1a is provided with shank 1b having two spaced tongues 1f which with shank 1b are rolled to form a pair of spaced eyes 1g, each receiving a split link 2 above described, the eyes 1g securely closing the overlapping ends 2a of the respective links 2 together, and the respective ends of chains 3 and 4 being secured in the respective links 2 before the eyes 1g are clamped therearound. On the shank 1b adjacent the base are knobs *1h* opposite each of the eyes *1g* adapted to form shoulders against which the outer tips of the rolled eyes abut, as shown in Fig. 9, to resist opening of the rolled eyes under undue stresses on chains 3 and 4 which may be occasioned when the chain becomes caught in fences or the like due to the animal grazing too closely thereto. Also, the outer ends of the eyes *1g* may be provided with inwardly extending bulged portions *1k* adapted to prevent the special links 2 from slipping out of the rolled eyes *1g* in event the eyes should accidentally became partially opened due to abnormal stresses on the chains. Also the sides of shank *1b* may be flanged as at *1m* to engage the outer edges of the pair of rolled eyes *1g* to prevent separation of the said eyes axially due to abnormal lateral pulls on the chains 3 and 4.

In practice the marker plate shown in Figs. 8 and 9 would be marketed with one eye *1g* closed around its related split link 2 carrying one end of the chain 3 and one end of chain 4, while the other eye *1g* is left open, so that in applying the marker to the live-stock it is only necessary for the herdsman to pass the chain around the spaced horns of the animal and then pass the free end of muzzle chain 4 through the nose ring 5 (Fig. 1) and secure an outer link of chain 4 in the split link 2 carried by the free end of chain 3, and then secure the latter link 2 in said open eye *1g*, thereafter applying sufficient pressure to close the open eye. Plate *1a* thus itself locks the ends of the chain 3 around the spaced horns of the animal, and locks the ends of the muzzle chain 4 together, the marker being thus secured in a permanent manner to the animal.

The provision of the two closely adjacent eyes *1g* in Figs. 8–9 receiving the special links 2 at the ends of the chain 3 prevents the chain 3 from twisting, and provides a marker plate in which the identification or indicia of the animal will lie substantially flat upon the forehead of the animal.

In the modification shown in Fig. 10, the assembly is identical with that shown in Figs. 1–3, and like parts bear the same numerals. In this modification however a third chain 7 is incorporate, same having its upper end engaged in split link 2, the chain passing downwardly along the muzzle of the animal and through nose ring 5 and dangling downwardly, same terminating near the ground. This third chain 7 permits the farmer or herdsman to readily grab or grasp the same to handle or control the animal, said chain 7 passing through the nose ring 5. In Fig. 11 the assembly is similar to that shown in Fig. 10 but includes the marker plate having two eyes *1g* and two split links 2 in the manner shown in Fig. 8 instead of the type of marker plate having one eye *1c* and one split link 2 in the manner shown in Fig. 6.

In all the modifications shown the markers may be marketed assembled or unassembled; also in Figs. 1–7 and 10 no strain whatsoever is imposed upon the plate *1a* in use; and the ends of the chains 3 and 4 are free to work up and down in the relatively large split links 2.

I do not limit my invention to the exact forms shown in the drawings, for obviously changes may be made therein within the scope of the claims.

I claim:

1. A muzzle chain for horned animals having nose rings, comprising a chain encircling the spaced horns of an animal; link means in said chain having overlapping ends, an openable eye-shaped means clamped around the overlapping ends, and a second chain looped through said nose ring and overlying the muzzle of the animal and having its ends engaged in the link means.

2. In a muzzle chain as set forth in claim 1, a chain having its upper end engaged in a split link, said chain passing downwardly through the nose ring and dangling adjacent the ground.

3. In a muzzle chain as set forth in claim 1, said eye-shaped member comprising a metallic strip rolled around the said overlapping ends of the split link.

4. A combined cattle marker and muzzle chain for horned animals having a nose ring, comprising a metallic indicia plate having a shank extending from an edge thereof rolled to form an eye; a split link having overlapping ends engaged in said eye with said overlapping ends clamped thereby; a chain encircling the spaced horns of the animal and having both ends engaged in the said link; and a second chain having both ends engaged in said split link and looped through the nose ring and overlying the muzzle of the animal.

5. In a combination as set forth in claim 4, a third chain having its upper end engaged in the said split link, said chain passing downwardly through the nose ring and dangling adjacent the ground.

6. In a combination as set forth in claim 4, means on the shank for preventing the eye from opening due to stress on the chains.

7. A combined cattle marker and muzzle chain for horned animals having a nose ring, comprising a metallic indicia plate having a shank extending from an edge thereof; a pair of spaced tongues extending from the end of said shank; said shank and tongues being rolled to form a pair of spaced eyes; a pair of split links each having overlapping ends engaged in said pair of eyes with the overlapping ends thereof clamped thereby; a chain encircling the spaced horns of the animal and having its ends engaged in the said respective links; and a second chain having its ends engaged in said pair of split links and looped through the nose ring and overlying the muzzle of the animal.

8. In a combination as set forth in claim 7, a third chain having its upper end engaged in one said split link, said chain passing downwardly through the nose ring and dangling adjacent the ground.

9. In a combination as set forth in claim 7, the sides of said shank being flanged and engaging the outer side edges of the spaced pair of eyes adjacent the outer ends of the tongues, to prevent axial separation of the pair of eyes due to stresses on the chains.

10. In a combination as set forth in claim 7, means on the shank engaged by the outer tips of the pair of rolled tongues to prevent opening of the eyes due to stresses on the chains.

11. In a combination as set forth in claim 7, means extending inwardly of the respective eyes adjacent the outer ends of the rolled tongues for preventing the split links from slipping out of the eyes when partially opened.

12. In a combination as set forth in claim 7, one eye being permanently clamped around its related link, the other eye being open and adapted before closing to receive the other split link after the first chain has been encircled around the spaced horns of the animal and the second chain passed through the nose ring, and the free ends of both chains engaged in said other split link and said link has been closed.

WILLIAM F. SCHACHT.